US012649220B2

(12) United States Patent
Neuhoff et al.

(10) Patent No.: US 12,649,220 B2
(45) Date of Patent: Jun. 9, 2026

(54) PISTON SEAL FOR POWERED FASTENER DRIVER

(71) Applicant: MILWAUKEE ELECTRIC TOOL CORPORATION, Brookfield, WI (US)

(72) Inventors: Mitchell T. Neuhoff, Waukesha, WI (US); Jason M. Julius, Waukesha, WI (US); David A. Bierdeman, New Berlin, WI (US); Logan M. Hietpas, Glendale, WI (US); Jacob N. Zimmerman, Pewaukee, WI (US); Jeremy J. Keifenheim, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/830,675

(22) Filed: Jun. 2, 2022

(65) Prior Publication Data

US 2022/0388135 A1 Dec. 8, 2022

Related U.S. Application Data

(60) Provisional application No. 63/195,741, filed on Jun. 2, 2021.

(51) Int. Cl.
B25C 1/04 (2006.01)
F16J 15/3284 (2016.01)

(52) U.S. Cl.
CPC .............. *B25C 1/047* (2013.01); *B25C 1/041* (2013.01); *F16J 15/3284* (2013.01)

(58) Field of Classification Search
None
See application file for complete search history.

(56) References Cited

U.S. PATENT DOCUMENTS 4,629,200 A * 12/1986 Ruddy ...................... F16J 9/28
277/936
5,433,452 A 7/1995 Edlund et al.
5,775,201 A 7/1998 Tanji et al.
(Continued)

FOREIGN PATENT DOCUMENTS

JP 6558437 B2 8/2019

OTHER PUBLICATIONS

Trelleborg Sealing Solutions, "Turcon© Glyd Ring® T," Catalog, Mar. 2020, pp. 305-314.

(Continued)

*Primary Examiner* — Tanzim Imam
(74) *Attorney, Agent, or Firm* — Michael Best & Friedrich LLP

(57) ABSTRACT

A powered fastener driver includes a housing, a cylinder supported by the housing, and a moveable piston positioned within and moveable along a driving axis of the cylinder. The piston includes a circumferential groove on an outer peripheral surface thereof. A driver blade is attached to the piston and moveable therewith between a top-dead-center (TDC) position and a driven or bottom-dead-center (BDC) position. A seal assembly is received in the circumferential groove. The seal assembly is configured to create a seal between the piston and the cylinder. The seal assembly includes a biasing member and a seal member positioned radially outwardly of the biasing member relative to the driving axis.

20 Claims, 9 Drawing Sheets

(56)          References Cited

U.S. PATENT DOCUMENTS

2005/0279802 A1 * 12/2005 Moeller ................... B25C 1/08
                                                    227/130
2016/0229043 A1 *  8/2016 Wyler ....................... B25C 1/06

OTHER PUBLICATIONS

International Search Report and Written Opinion for Application
No. PCT/US2022/031906 dated Sep. 19, 2022 (10 pages).

* cited by examiner

PISTON SEAL FOR POWERED FASTENER DRIVER

CROSS-REFERENCE TO RELATED APPLICATIONS

This application claims priority to U.S. Provisional Patent Application No. 63/195,741 filed on Jun. 2, 2021, the entire content of which is incorporated herein by reference.

FIELD OF THE INVENTION

The present invention relates to powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a powered fastener driver including a housing, a cylinder supported by the housing, and a moveable piston positioned within and moveable along a driving axis of the cylinder. The piston includes a circumferential groove on an outer peripheral surface thereof. A driver blade is attached to the piston and moveable therewith between a top-dead-center (TDC) position and a driven or bottom-dead-center (BDC) position. A seal assembly is received in the circumferential groove. The seal assembly is configured to create a seal between the piston and the cylinder. The seal assembly includes a biasing member and a seal member positioned radially outwardly of the biasing member relative to the driving axis.

The present invention provides, in another aspect, a driving mechanism for a powered fastener driver. The driving mechanism includes a cylinder supported by the powered fastener driver, a storage chamber in fluid communication with the cylinder, and a piston moveable within the cylinder between a top-dead-center (TDC) position and a bottom-dead-center (BDC) position. The piston includes a circumferential groove on an outer surface thereof. The driving mechanism further includes a seal assembly received within the circumferential groove. The seal assembly includes a biasing member and an annular seal member positioned radially outward of the biasing member relative to the driving axis. The seal member is configured to slidably engage the cylinder.

The present invention provides, in yet another aspect, a powered fastener driver including a housing, a cylinder supported by the housing, and a piston positioned within and moveable along a driving axis of the cylinder. The piston includes a first circumferential groove on an outer peripheral surface of the piston and a second circumferential groove on the outer peripheral surface of the piston. A driver blade is attached to the piston and moveable therewith between a top-dead-center (TDC) position and a bottom-dead-center (BDC) position. A guide ring is disposed within the second circumferential groove and configured to guide motion of the piston within the cylinder. A seal assembly is received in the first circumferential groove and configured to create a seal between the piston and the cylinder. The seal assembly includes a biasing member and a seal member positioned radially outwardly of the biasing member relative to the driving axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
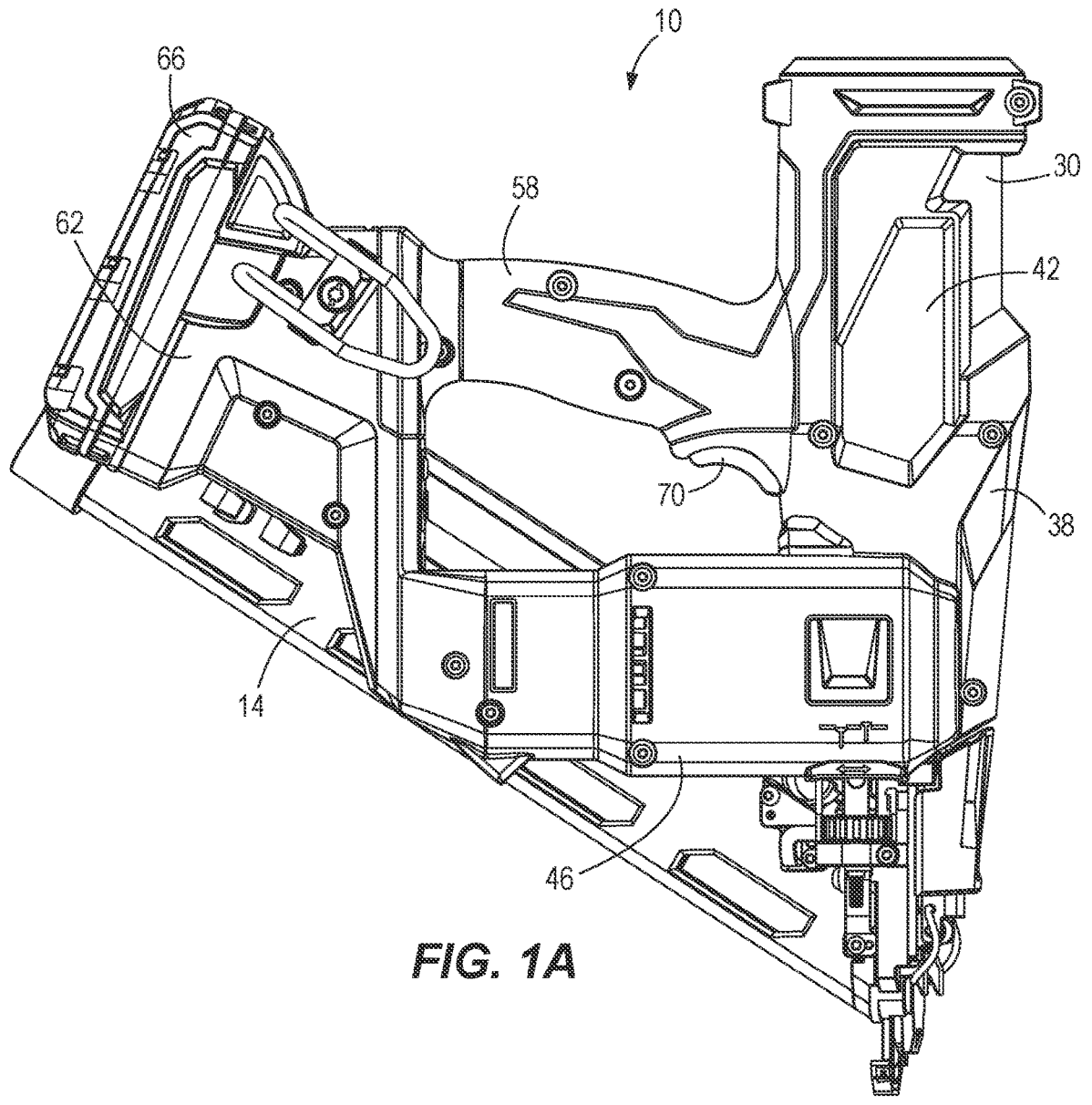
FIG. 1A is a side view of a powered fastener driver in accordance with an embodiment of the invention.
Figure 1B:
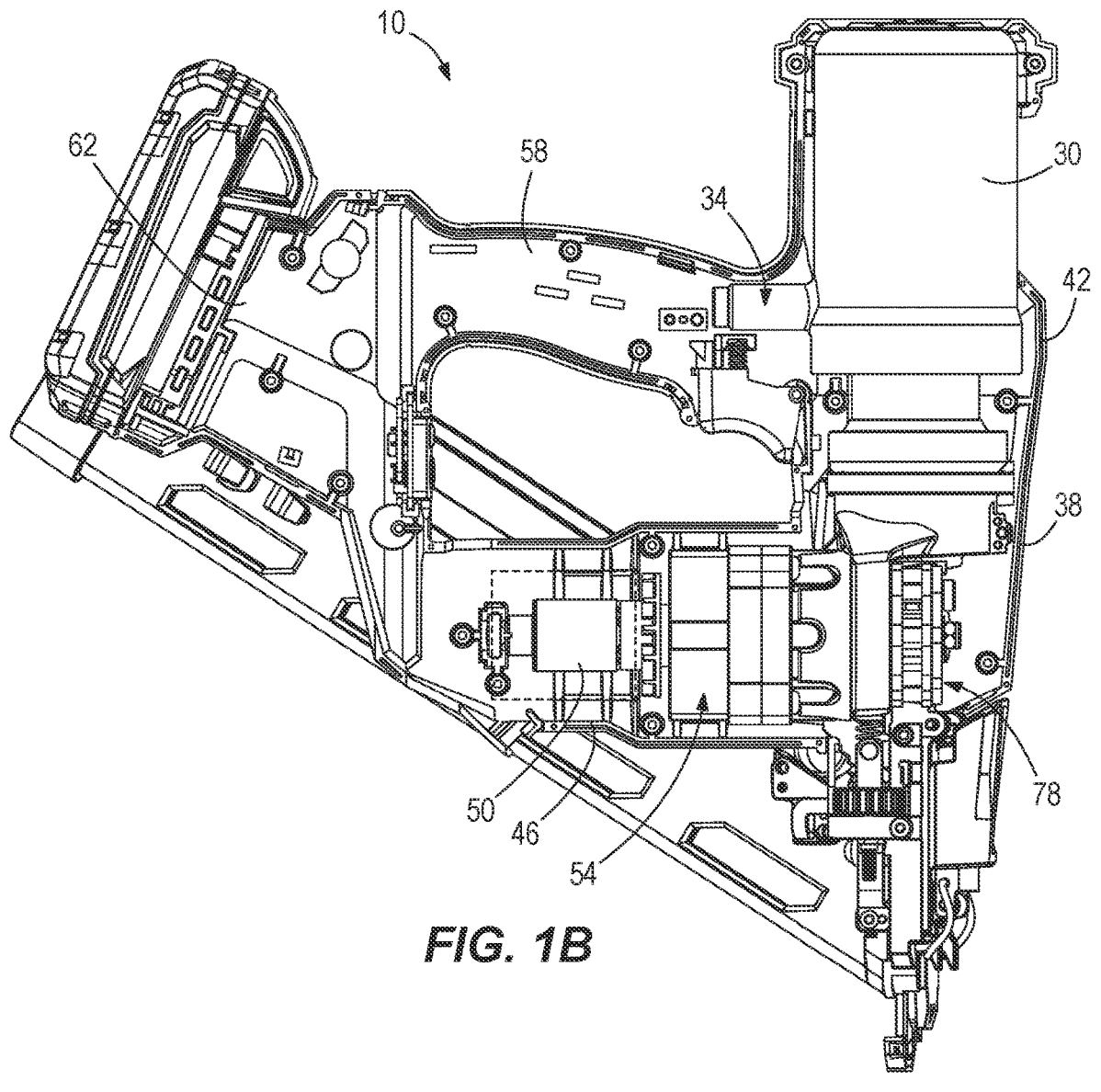
FIG. 1B is another side view of the powered fastener driver of FIG. 1, with portions of a housing of the powered fastener driver of FIG. 1 removed.
Figure 2:
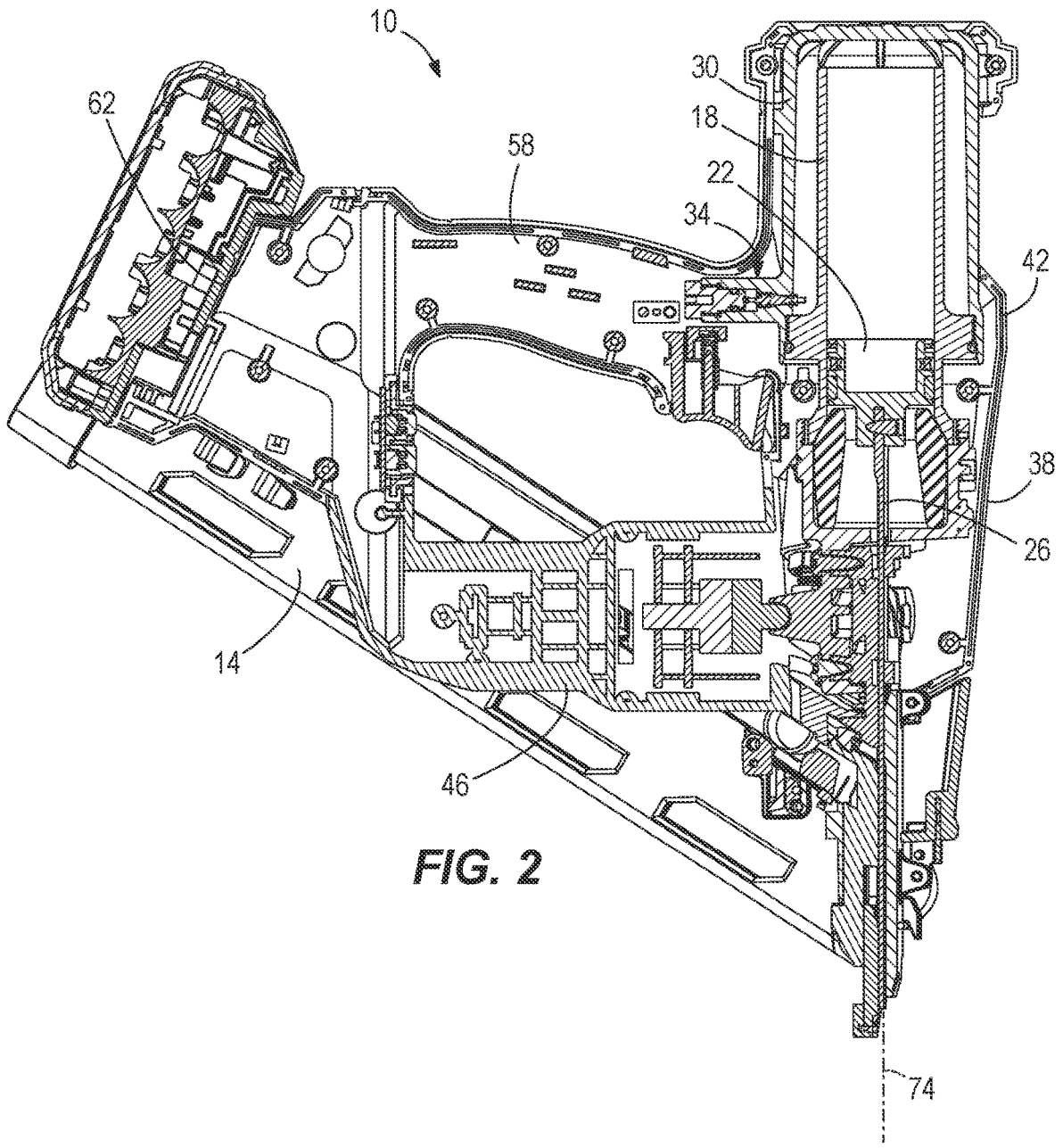
FIG. 2 is a cross-sectional view of the powered fastener driver of FIG. 1.
Figure 3:
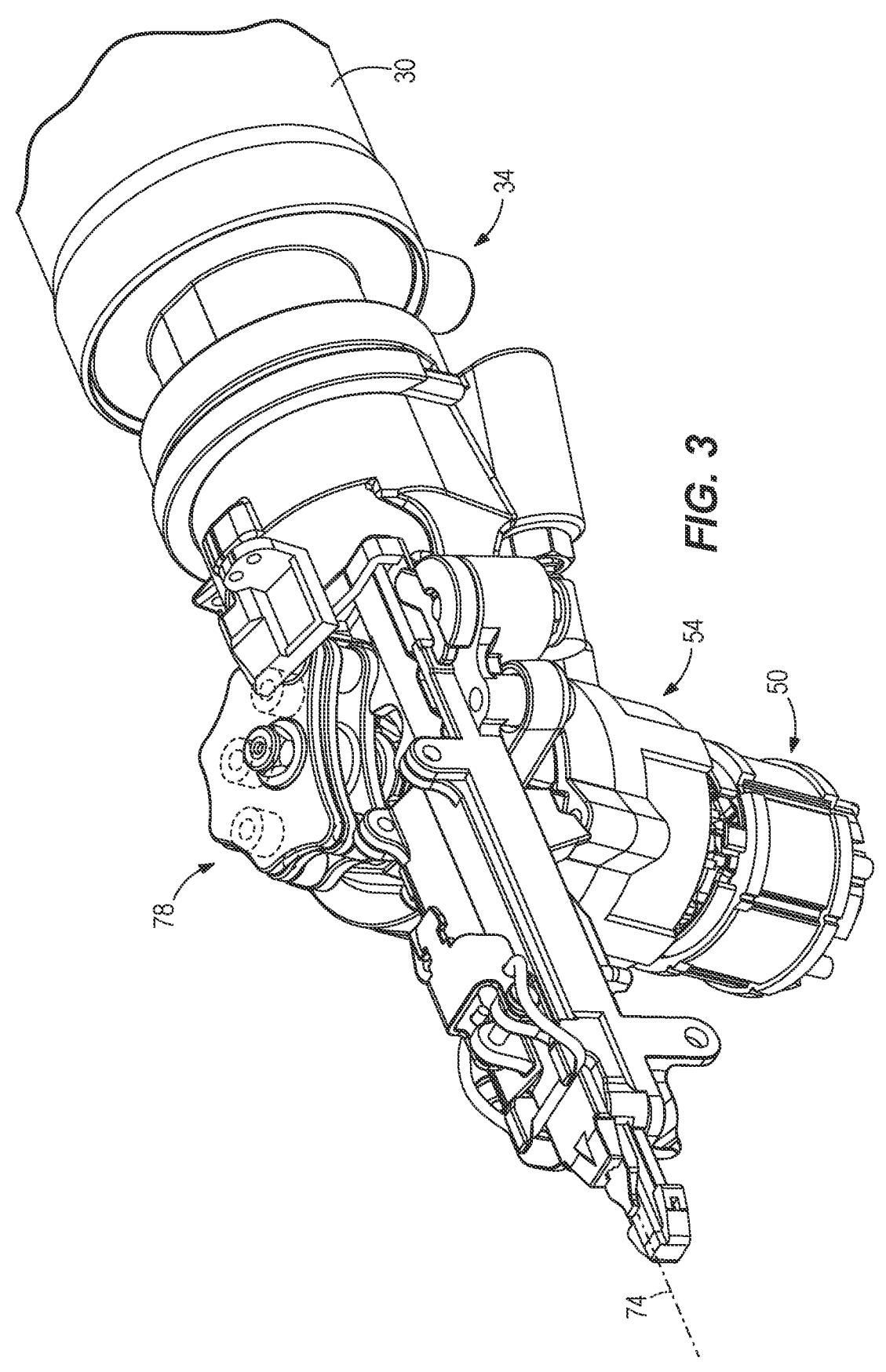
FIG. 3 is a perspective view of the powered fastener driver of FIG. 1, with portions removed for clarity.

With reference to FIGS. 1A-3, powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIG. 2). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 1B, the driver 10 further includes a fill valve 34 coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

With reference to FIGS. 1A-1B, the fastener driver 10 includes a housing 38 having a cylinder housing portion 42 and a motor housing portion 46 extending therefrom. The cylinder housing portion 42 is configured to support the cylinders 18, 30, whereas the motor housing portion 46 is configured to support a motor 50 and a transmission 54 operatively coupled to the motor 50. The illustrated transmission 54 is configured as a planetary transmission having three planetary stages. In alternative embodiments, the transmission 54 may be a single-stage planetary transmission, or a multi-stage planetary transmission including any number of planetary stages.

The housing 38 further includes a handle portion 58 extending from the cylinder housing portion 42, and a battery attachment portion 62 coupled to an opposite end of the handle portion 58. A battery 66 (FIG. 1A) is electrically connectable to the motor 50 for supplying electrical power to the motor 50. The handle portion 58 supports a trigger 70, which is depressed by a user to initiate a firing cycle of the fastener driver 10.

With reference to FIG. 2, the inner cylinder 18 and the driver blade 26 define a longitudinal (or "driving") axis 74. During a firing cycle, the driver blade 26 and piston 22 are moveable between a top-dead-center (TDC) position and a driven or bottom-dead-center (BDC) position. The fastener driver 10 further includes a lifter assembly 78 (FIG. 3), which is powered by the motor 50, and which is operable to move the driver blade 26 from the BDC position toward the TDC position.

A driving mechanism of the fastener driver 10 cycles to drive a fastener into a workpiece. The driving mechanism includes the lifter assembly 78, the motor 50, the transmission 54, the inner cylinder 18, the piston 22, and the storage chamber cylinder 30. In operation, the lifter assembly 78 drives the piston 22 and the driver blade 26 toward the TDC position by energizing the motor 50. As the piston 22 and the driver blade 26 are driven toward the TDC position, the gas above the piston 22 is compressed. Prior to reaching the TDC position, the motor 50 is deactivated and the piston 22 and the driver blade 26 are held in a ready position, which is located between the TDC and the BDC positions. Upon user depression of the trigger 70 (FIG. 1A), the lifter assembly 78 continues lifting of the driver blade 26 from the ready position to the TDC position where the driver blade 26 is released from the lifter assembly 78. When released, the compressed gas above the piston 22 and within the storage chamber cylinder 30 drives the piston 22 and the driver blade 26 to the BDC position, thereby driving a fastener into the workpiece. The illustrated fastener driver 10 therefore operates on a gas spring principle utilizing the lifter assembly 78 and the piston 22 to compress the gas within the inner cylinder 18 and the storage chamber cylinder 30. Further detail regarding the structure and operation of the fastener driver 10 is provided below.

Figure 4:
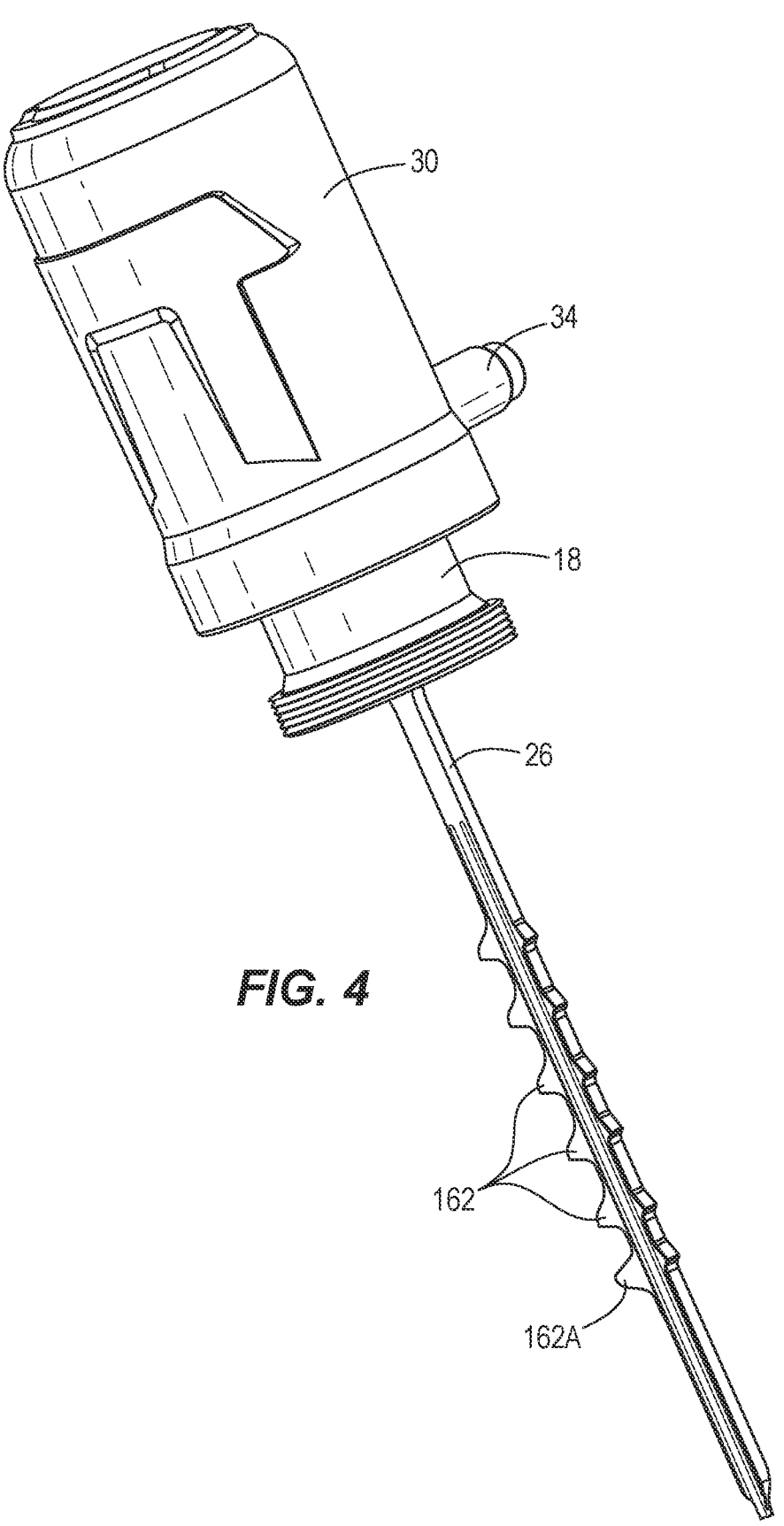
FIG. 4 is a front perspective view of an outer storage chamber cylinder, an inner cylinder, and a driver blade of the powered fastener driver of FIG. 1.
Figure 5:
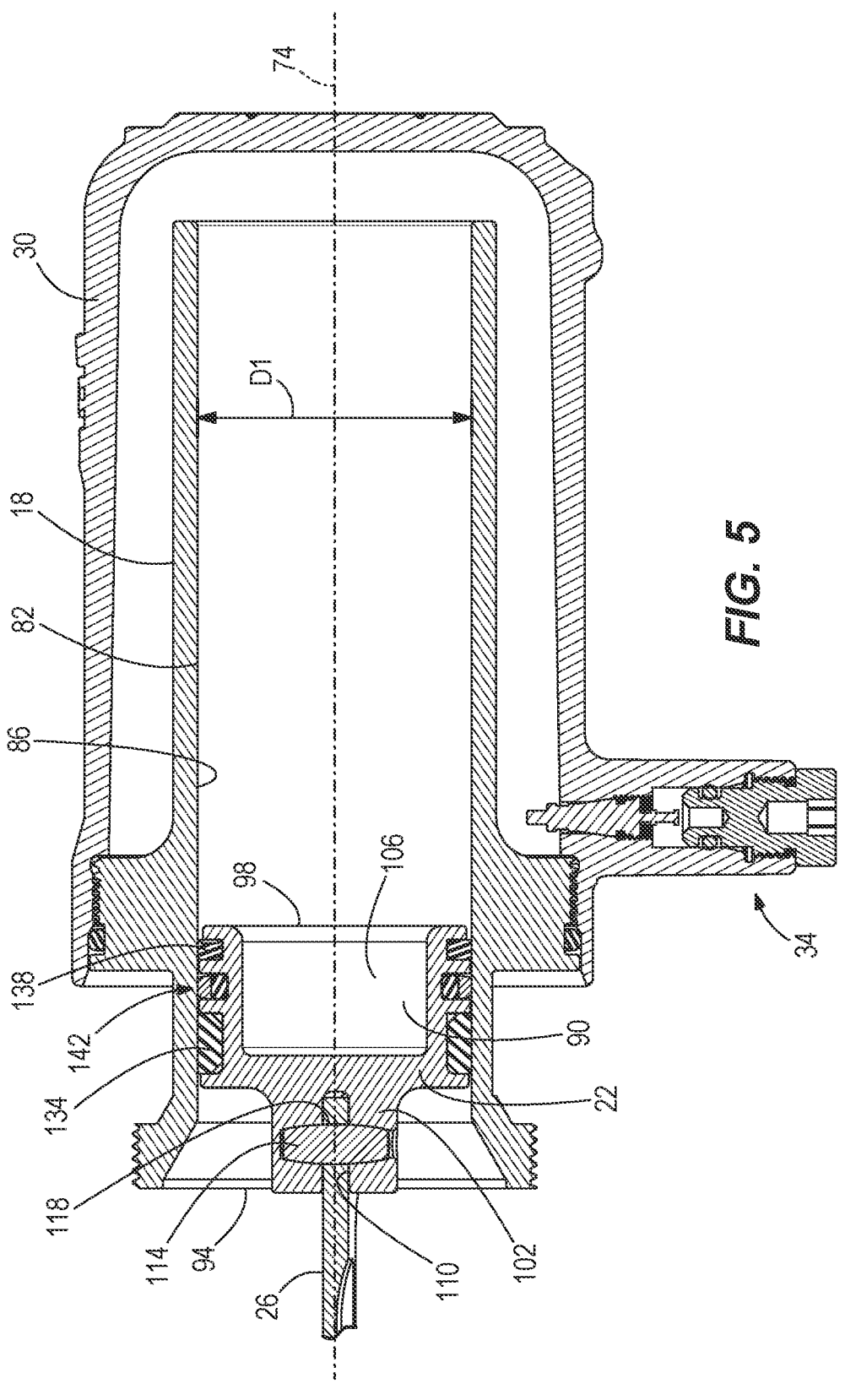
FIG. 5 is a side cross-sectional view of the outer storage chamber cylinder, the inner cylinder, and a portion of the driver blade of FIG. 4, illustrating a piston coupled to the driver blade and positioned in the inner cylinder.

With reference to FIGS. 4-5, the inner cylinder 18 extends at least partially out of the storage chamber cylinder 30. The inner cylinder 18 includes a cylindrical wall 82 having a surface 86. The piston 22 is slidably moveable relative to the cylindrical wall 82 along the driving axis 74. The inner cylinder 18 has a diameter D1.

Figure 6:
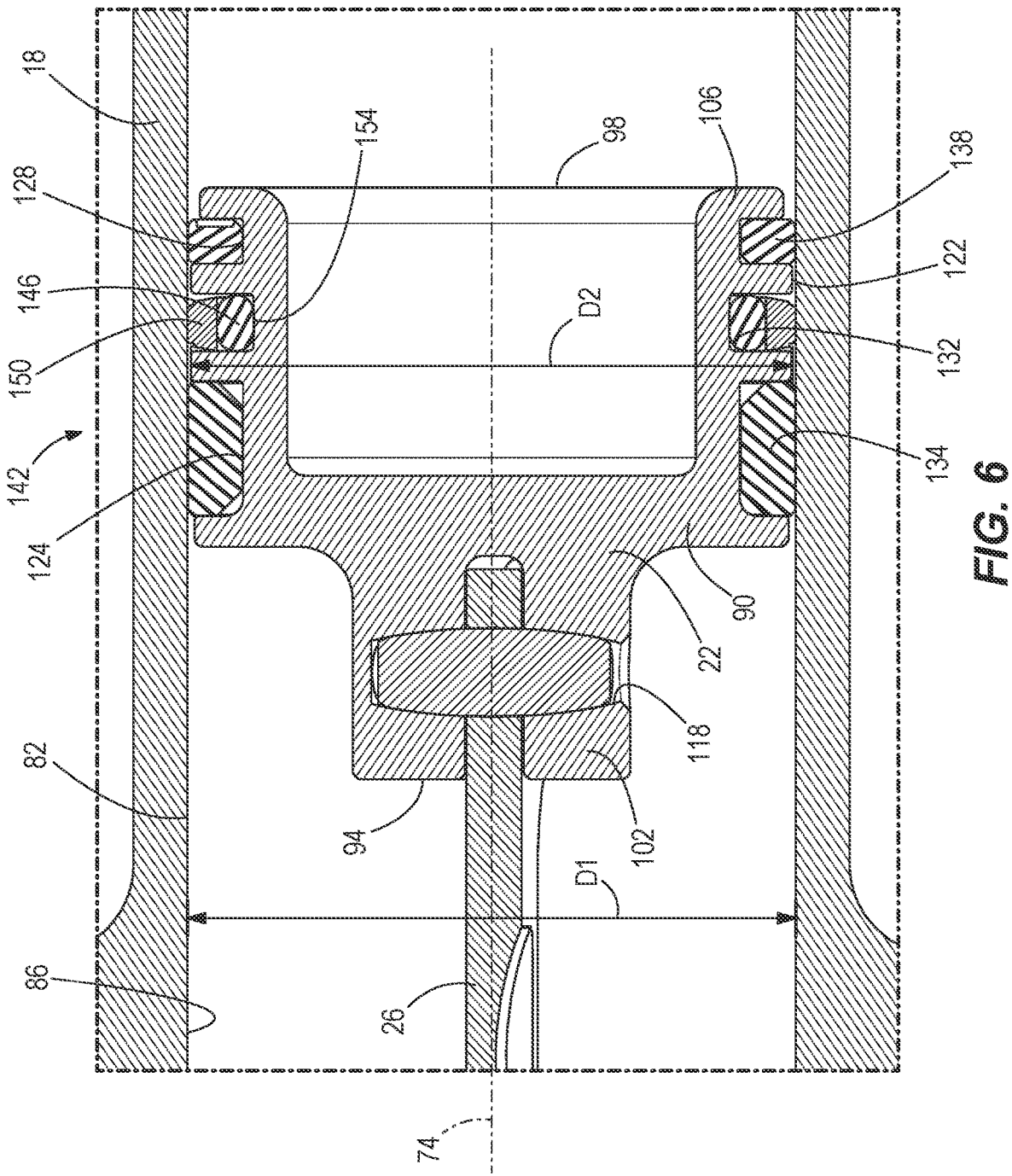
FIG. 6 is an enlarged view of the piston positioned in the inner cylinder of FIG. 5, illustrating a seal assembly of the piston.

With reference to FIGS. 2 and 6, the piston 22 includes a body 90 extending between a first end 94 and a second end 98. The illustrated body 90 has a first portion 102 and a second portion 106. The first portion 102 includes the first end 94 and the second portion 106 includes the second end 98. The illustrated driver blade 26 is coupled to the piston 22 by a pinned connection. More specifically, the first portion 102 of the piston includes a slot 110 extending from the first end 94 therewithin. A pin 114 (FIG. 5) extends through the slot 110 and a hole 118 defined by a portion of the driver blade 26 within the slot 110. In other embodiments, the driver blade 26 is coupled to the piston 22 by a threaded connection.

With reference to FIGS. 5-8, the second portion 106 of the piston 22 includes an outer circumferential surface 122 having a diameter D2. The diameter D2 is selected to be marginally less than the diameter D1 of the inner cylinder 18. In addition, the outer circumferential surface 122 includes a plurality of grooves 124, 128, 132. In the illustrated embodiment, the piston 22 includes a first groove 124 proximate the first portion 102, a second groove 128 proximate the second end 98, and a third groove 132 positioned between the first and second grooves 124, 128, respectively. Each of the first and second grooves 124, 128 receives a guide ring 134, 138. Each of the guide rings 134, 138 is configured to guide the piston 22 along the driving axis 74 within the inner cylinder 18. Each of the guide rings 134, 138 may be made from a material such as polyoxymethylene (POM) or polytetrafluoroethylene (PTFE). In other embodiments, the guide rings 134, 138 may be made from other materials, such as nylon, bronze filled PTFE, glass filled PTFE, other polymeric based materials, and the like. In addition, each of the guide rings 134, 138 is configured to inhibit contact between the body 90 of the piston 22 and the cylindrical wall 82. The first groove 124 receives a front guide ring 134 and the second groove 128 receives a rear guide ring 138.

The third groove 132 receives a seal assembly 142. The seal assembly 142 includes an annular biasing member 146 and an annular seal member 150 radially outward of the biasing member 146 relative to the driving axis 74, such that the seal member 150 circumferentially surrounds the biasing member 146. The biasing member 146 contacts an inner surface 154 of the third groove 132, and the seal member 150 slidably engages the surface 86 of the cylindrical wall 82 of the inner cylinder 18.

Figure 7:
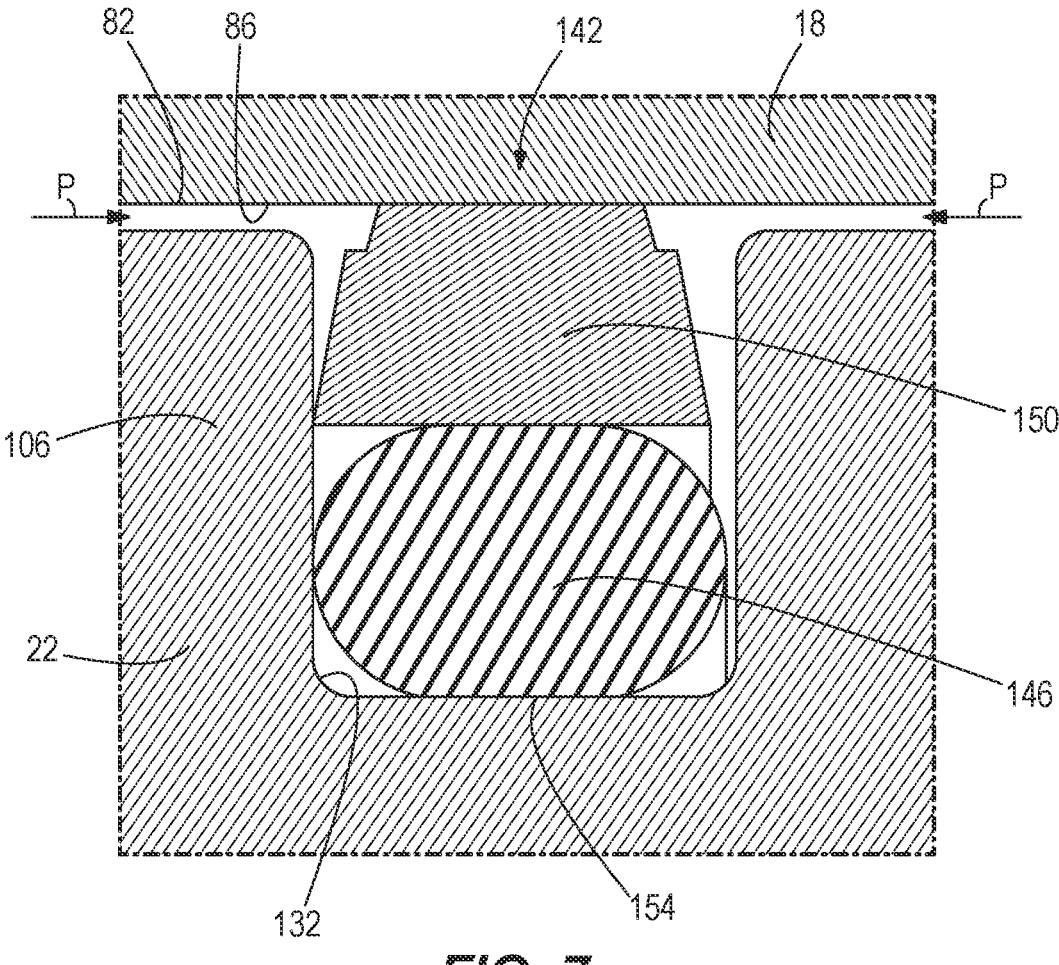
FIG. 7 is an enlarged view of the seal assembly of FIG. 6.
Figure 8:
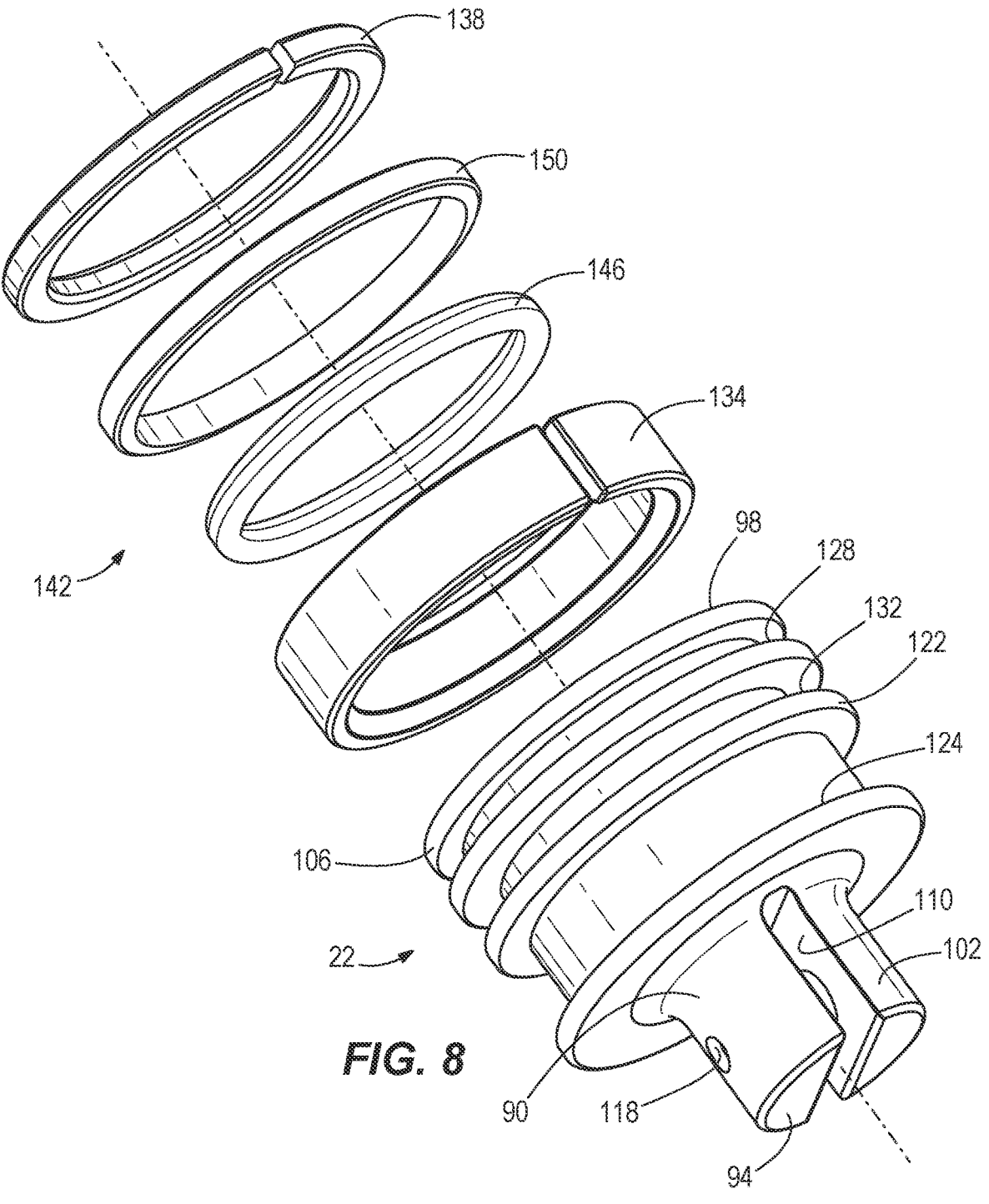
FIG. 8 is an exploded view of the piston and the seal assembly of FIG. 6.

With particular reference to FIG. 7, each of the biasing member 146 and the seal member 150 has a cross-sectional shape. The biasing member 146 has a generally circular or oval cross-sectional shape in an assembled state with the piston 22 located within the inner cylinder 18. The seal member 150 has a trapezoidal or stepped-trapezoidal cross-sectional shape. In particular, the trapezoidal cross-sectional shape tapers from the end adjacent the first seal member 146 toward the end contacting the surface 86 of the cylindrical wall 82 of the inner cylinder 18. In some embodiments of the seal assembly 142, the biasing member 146 is an elastomeric ring, such as an O-ring. And, in some embodiments of the seal assembly 142, the seal member 150 is a plastic (i.e., polymeric) ring, such as a Turcon® Glyd Ring® T such as one that is commercially available from Telleborg Sealing Solutions Germany GmbH located in Stuttgart, Germany. In other embodiments, the seal member 150 may comprise of an elastic material such as PTFE, polyurethane (PU), other polymeric based materials, and the like.

With reference to FIG. 5, when assembled, the biasing member 146 continuously exerts a radially outward biasing force against the seal member 150. In particular, the biasing member 146 is configured to preload the seal member 150 against the inner surface 86 of the inner cylinder 18, thereby causing the seal member 150 to maintain a close sliding fit with the surface 86 as the piston 22 moves between the TDC position and the BDC position. Such a close sliding fit creates a moving seal between the piston 22 and the inner cylinder 18 as the piston 22 reciprocates between the TDC position and the BDC position, thereby inhibiting or preventing the expanding gas above the piston 22 from leaking past the seal assembly 142, which may otherwise cause a loss of compression within the inner cylinder 18.

In operation, upon the trigger 70 being pulled to initiate a fastener driving cycle, the motor 50 is activated to rotate the lifter assembly 78, thereby displacing the driver blade 26 upward past the ready position a slight amount before a lower-most tooth 162A on the driver blade 26 disengages the lifter assembly 78 (at the TDC position of the driver blade 26). Thereafter, the piston 22 and the driver blade 26 are thrust downward toward the BDC position by the expanding gas in the storage chamber cylinder 30. As the driver blade 26 is displaced toward the BDC position, the motor 50 remains activated to continue rotation of the lifter assembly 78.

As the driver blade 26 is displaced toward the BDC position, the seal member 150 of the piston 22 movably engages the surface 86 of the inner cylinder 18 as the driver blade 26 is driven from the TDC position toward the BDC position. In particular, the seal member 150 maintains the seal between the piston 22 and the inner cylinder 18.

Shortly after the driver blade 26 reaches the BDC position, the lifter assembly 78 re-engages one of the teeth 162 on the driver blade 26 and continued rotation of the lifter assembly 78 raises the driver blade 26 and the piston 22 toward the ready position. The seal member 150 maintains contact with the surface 86 of the inner cylinder 18. Continued rotation of the lifter assembly 78 raises the driver blade 26 to the ready position.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. A powered fastener driver comprising:
a housing;
a cylinder supported by the housing;
a piston positioned within and moveable along a driving axis of the cylinder, the piston including a circumferential groove on an outer peripheral surface thereof;
a driver blade attached to the piston and moveable therewith between a top-dead-center (TDC) position and a bottom-dead-center (BDC) position;
a seal assembly received in the circumferential groove and configured to create a seal between the piston and the cylinder, the seal assembly including a biasing member and a seal member positioned radially outward of the biasing member relative to the driving axis;
a lifter operable to move the driver blade from the BDC position toward the TDC position; and
a transmission for providing torque to the lifter.

2. The powered fastener driver of claim 1, wherein the seal member has a trapezoidal cross-sectional shape.

3. The powered fastener driver of claim 1, wherein the seal member has a cross-sectional shape that is tapered in a radially outward direction.

4. The powered fastener driver of claim 1, wherein the biasing member is made from an elastomeric material, and wherein the seal member is made from a plastic material.

5. The powered fastener driver of claim 4, wherein the biasing member is an O-ring.

6. The powered fastener driver of claim 1, wherein the biasing member is configured to pre-load the seal member against the cylinder.

7. The powered fastener driver of claim 1, wherein the circumferential groove includes a uniform width, the width being measured parallel to the driving axis.

8. The powered fastener driver of claim 1, wherein a width of the biasing member is equal to or greater than a width of the seal member, the width of each of the biasing member and the seal member being measured parallel to the driving axis.

9. A driving mechanism for a powered fastener driver, the driving mechanism comprising:
a cylinder supported by the powered fastener driver;
a storage chamber in fluid communication with the cylinder;
a piston moveable within the cylinder between a top-dead-center (TDC) position and a bottom-dead-center (BDC) position, the piston including a circumferential groove on an outer surface thereof;
a seal assembly received within the circumferential groove, the seal assembly including a biasing member and an annular seal member positioned radially outward of the biasing member relative to a driving axis of the cylinder, wherein the seal member is configured to slidably engage the cylinder;
a lifter operable to move the piston from the BDC position toward the TDC position; and
a transmission for providing torque to the lifter.

10. The driving mechanism of claim 9, wherein the piston includes a second circumferential groove positioned on the outer surface of the piston, and wherein a guide ring is received within the second circumferential groove to guide the piston within the cylinder.

11. The driving mechanism of claim 10, wherein the guide ring is formed from polyoxymethylene (POM) or polytetrafluoroethylene (PTFE).

12. The driving mechanism of claim 11, wherein the annular seal member is formed from a material that is different from a material of the guide ring.

13. The driving mechanism of claim 9, wherein the biasing member is disposed between the piston and the seal member, and wherein the biasing member applies a pre-load force to the seal member in a direction towards the cylinder.

14. The driving mechanism of claim 9, wherein the biasing member is an elastomeric ring.

15. A powered fastener driver comprising:
a housing;
a cylinder supported by the housing;
a piston positioned within and moveable along a driving axis of the cylinder, the piston including a first circumferential groove on an outer peripheral surface of the piston and a second circumferential groove on the outer peripheral surface of the piston;
a driver blade attached to the piston and moveable therewith between a top-dead-center (TDC) position and a bottom-dead-center (BDC) position;
a guide ring disposed within the second circumferential groove, the guide ring configured to guide motion of the piston within the cylinder;
a seal assembly received in the first circumferential groove and configured to create a seal between the piston and the cylinder, the seal assembly including a biasing member and a seal member positioned radially outwardly of the biasing member relative to the driving axis;
a lifter operable to move the driver blade from the BDC position toward the TDC position; and
a transmission for providing torque to the lifter.

16. The powered fastener driver of claim 15, wherein the guide ring inhibits contact between the outer peripheral surface of the piston and the cylinder.

17. The powered fastener driver of claim 16, wherein the seal member slidably engages the cylinder.

18. The powered fastener driver of claim 15, wherein the seal member has a trapezoidal cross-sectional shape that is tapered in a radially outward direction.

19. The powered fastener driver of claim 15, further comprising a third circumferential groove on the outer peripheral surface of the piston, and a second guide ring disposed within the third circumferential groove.

20. The powered fastener driver of claim 19, wherein the first circumferential groove is disposed between the second circumferential groove and the third circumferential groove.

* * * * *